(12) United States Patent
Hertling et al.

(10) Patent No.: US 6,944,634 B2
(45) Date of Patent: Sep. 13, 2005

(54) FILE CACHING METHOD AND APPARATUS

(75) Inventors: William Edward Hertling, Portland, OR (US); Michael Dean Whitmarsh, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 10/128,916

(22) Filed: Apr. 24, 2002

(65) Prior Publication Data

US 2003/0204529 A1 Oct. 30, 2003

(51) Int. Cl.[7] .............................................. G06F 17/30
(52) U.S. Cl. ............................. 707/200; 707/1; 707/10; 709/203
(58) Field of Search .............................. 707/1–3, 9, 10, 707/100, 200, 201; 709/203; 713/150, 164, 165, 182, 151

(56) References Cited

U.S. PATENT DOCUMENTS

| | | | | | |
|---|---|---|---|---|---|
| 5,987,123 | A | * | 11/1999 | Scott et al. | 713/165 |
| 6,047,356 | A | * | 4/2000 | Anderson et al. | 711/129 |
| 6,249,866 | B1 | * | 6/2001 | Brundrett et al. | 713/165 |
| 6,405,315 | B1 | * | 6/2002 | Burns et al. | 713/190 |
| 6,766,352 | B1 | * | 7/2004 | McBrearty et al. | 709/203 |

* cited by examiner

*Primary Examiner*—John Breene
*Assistant Examiner*—Cheryl Lewis (57) ABSTRACT

A method of managing data files in a file caching server provides access to a plurality of stored data files. The method is to receive a request for a file, which is identified by a cryptographically secure checksum. The availability of the file is determined using the cryptographically secure checksum and, if said file is available, retrieving the file. If the file is not available to said file caching server, then a file request is issued to, and the file is retrieved from another file server where the file with the cryptographically secure checksum exists.

25 Claims, 4 Drawing Sheets

FILE CACHING METHOD AND APPARATUS

BACKGROUND OF THE INVENTION

A problem with file caching over networks such as the Internet is that files are sometimes needlessly re-transmitted from a central-repository file server to one or more peripheral file caching servers. Unnecessary file re-transmission usually occurs when a single file has two or more names by which it can be requested or stored. A client computer's request for a copy of the file to a file caching server using one name can cause the file caching server to needlessly request the file from a central file server if the file caching server already has a copy of the requested file, albeit under a different name or version.

A further problem with data caching is the time wasted to needlessly retrieve files from the file server 24 to the file caching server 10 when one or more of the clients 14 require resources from the file server 24 which might already be available on the file caching server 10, especially when using a slow speed or limited bandwidth connection 22 between computer systems. When a file, web page or other data object is requested from the file server 24 the requested item might be retrievable using different file names, web page URLs, or other identifiers resulting in unnecessary file transfers between the file server 24 and the caching server 10.

Another problem with prior art file storage is the redundant storage under different file names of files that contain identical data. This can particularly be a problem in the context of file storage associated with the backup of files from many computers. In this context, a large number of computers may have files identical to the files on many of the other computers. A file storage device used for file backup of many computers may therefore store many copies of identical files having different names.

DETAILED DESCRIPTION OF THE PREFERRED EMBODIMENT

Figure 1:
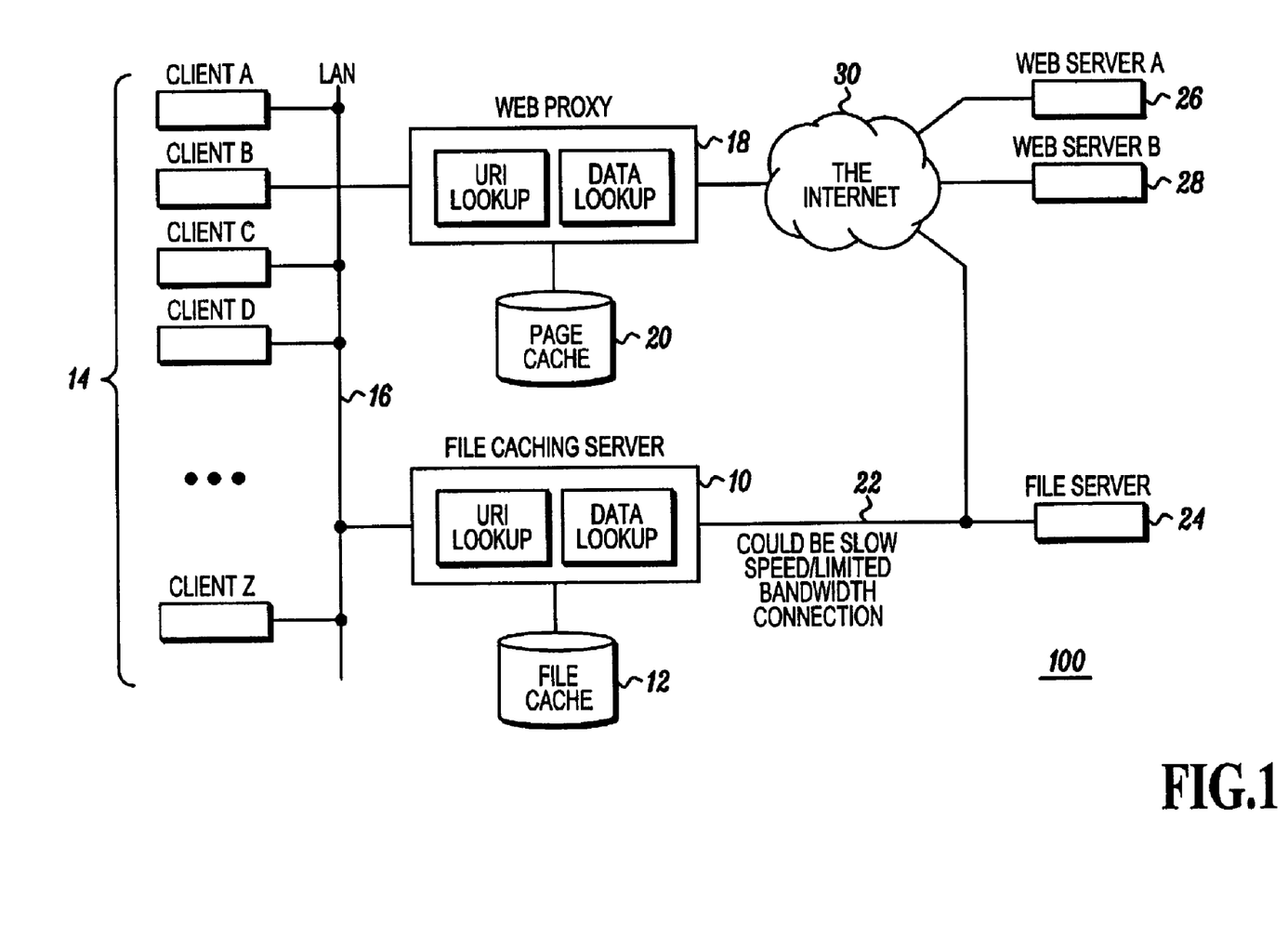
FIG. 1 is a simplified block diagram of a data caching network and a web caching network.

FIG. 1 depicts a data network 100 that can be used for caching (i.e. storing for other computers) data or files. A data or "file" caching server 10 stores various types of data files in a file cache device 12 and makes cached files available to client computers 14 via a network 16, such as a local area or wide area network (LAN or WAN respectively). Requests to a file server 24 from a client 16 are frequently handled by a file caching server 10—although transparently to the client 16. The file caching server 10 act as an image or functionally duplicate copy of the file server 24, improving the apparent responsiveness of the server 24. Also shown in FIG. 1 is a web proxy 18 that has a web page cache 20 by which web pages stored in the cache memory device 20 can be made available to the various client computers 14 also via the network 16.

The file caching server 10 is operatively coupled to a file server 24 via a connection 22 that typically has slow data transfer rates (slow connection) or limited data transfer quantity (low available bandwidth) relative to the bandwidth of the LAN 16 or relative to the aggregate bandwidth of the client computer 14 connections to the file caching server 10. The connection 22 between the file caching server 10 and the file server 24 may be implemented by way of a dialup connection the maximum data rate is typically less than 56 kbps.

The file caching server 10 makes the contents of the file server 24 that is of interest to one or more of the client computers 14, physically or electrically close to the client computers 14 thereby reducing the time required to transfer a file from the file cache 12 to one or more of the client computers 14. Stated alternatively, by maintaining a copy of one or more files normally stored on the file server 24 in a file caching server 10, the file transfer time via the connection 22 can be reduced or eliminated. Instead, the file caching server 10 appears to the client computers 14 to be the server 24 albeit it is a mirror image of the file server 24 the contents of which can be more quickly or more rapidly accessed by the client computers 14. The web proxy server 18 serves as a more-readily accessible web resource than the web servers a and b, 26 and 28 respectively both of which are made logically available via the web proxy 18 and the communications it has with the servers 26 and 28 via the Internet 30.

In data networks, including LANs, WANs as well as the Internet, unnecessary file transfers between computers can be avoided if it can be determined that a file requested from a server is already resident in or available on a caching server. Determining whether a file is resident on a computer, such as a server, can be ascertained by both a file name, such as a string of alphanumeric characters, and a numerical file identifier that uniquely identifies files. By using cryptographically secure checksums as numerical file identifiers, a file caching server that receives a request for a particular file or files can quickly determine if the file or files are available locally, simply by detecting the presence or absence of the cryptographically secure checksum used to identify the requested file or files. The Checksums are stored in the lookup tables 46 and 48 in FIG. 1 and referenced in blocks 330 and 342 in FIG. 3. The table can be any storage mechanism known to those with skill in the art, e.g. RAM or a file on disk.

Figure 2:
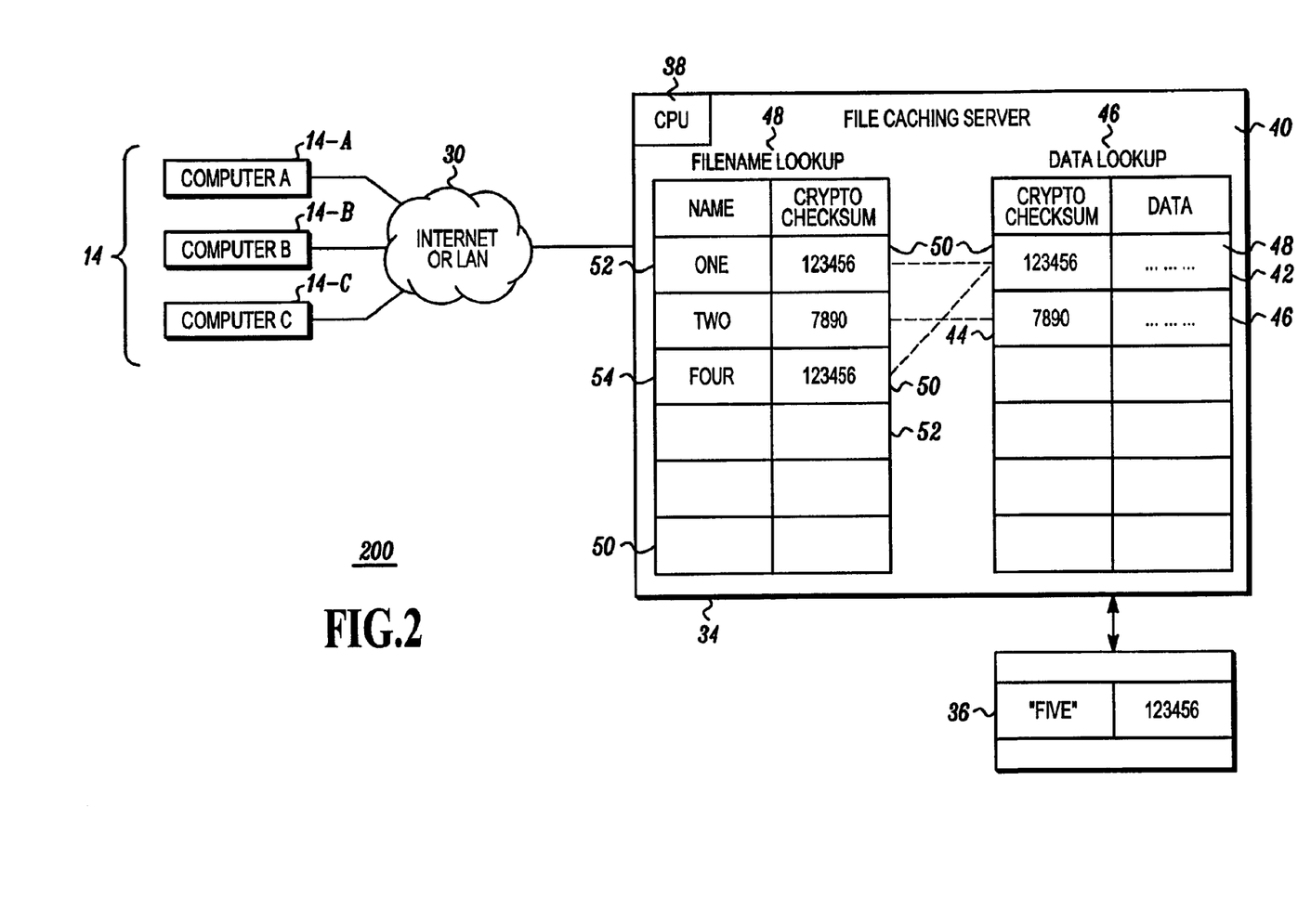
FIG. 2 is a simplified depiction of an exemplary file storage system using unique cryptographically secure file identifiers according to an embodiment of the present invention.

FIG. 2 shows a simplified depiction of an exemplary file storage and retrieval system 200 which reduces unnecessary file transfers. Three client computers 14 (identified as 14-A; 14-B; and 14-C) are operatively coupled to a file caching server 34 via a data network 30. The network 30 can be embodied as a local area network (LAN), a wide area network (WAN) or the Internet as well as a slow speed/limited bandwidth dialup connection.

The file caching server 34 includes a central processing unit (CPU) 38 which executes program instructions by which files sent to the file caching server 34 from another file server 36, can be stored within, and retrieved from the CPU's associated memory 40. Memory 40 can be embodied as semiconductor memory such as static or dynamic random access memory (RAM) as well as magnetic disk media or optical storage devices such as CR-ROM.

A file caching server is a dedicated network server or service within a server that caches files in order to speed up access to, and delivery of, information that has already been retrieved by a previous user. The file caching server 34 acts as a virtual copy or image of the main or central file server 36. In a data network, a single, central file server 36 might become overwhelmed with file save and file retrieval requests. Much (but not all) of the information stored on the file central file server 36 is also stored on the file caching server 34 in storage media that is preferably directly accessible to the file caching server 34, e.g., by the file caching server accessing its own local mass storage, RAM, or other storage media, without having to obtain access permission from another computer. As is well-known in the art, the existence and operation of the file caching server 34 is usually transparent to client computers 14. The file caching server facilitates the distribution of files stored within the central file server 36 and the storage of files to the central file server 36 by way of copies of those same files kept within the file caching server memory 40.

Instead of using file names, (where a "file name" may be considered to be any string or combination of alphabetic or numeric characters, the combination of which is not calculated from or determined by a file's content) to identify files, files stored within the file caching server 34 can be more readily identified, accessed and retrieved by using cryptographically secure checksum file identifiers that are uniquely calculated from the actual contents of a data file that is retrievably stored within, or retrieved from the memory 40 of the file caching server 34. Cryptographically secure checksums can also be used to unambiguously identify files even when a file is assigned several different names or other identifiers.

Cryptographically secure checksums are calculated using the actual contents of a file. They can be calculated from even very large files and can be several hundreds of bytes in length, or more. They are characterized by their ability to uniquely identify a particular file using the actual file contents, which are processed according to an algorithm to yield a numerical index, the value of which is uniquely established by the file's contents. Stated alternatively, the contents of a particular file will yield the same particular cryptographically secure checksum regardless of the name assigned to the particular file. Furthermore, the chances that two different sets of file data could produce the same cryptographically secure checksum is almost nil.

Files stored within the memory 40 of the file caching server 36 are organized by using the cryptographically secure checksum as a data entry in a data lookup table 42, the entries of which correlate a single cryptographically secure checksum 44 to a file's contents 48 stored within the memory 40.

A cryptographically secure checksum 44 in the data lookup table 46 is indexed by (also considered as being pointed to or correlated with) one or more copies of a cryptographically secure checksum 50 stored in a file name lookup table 48. The file name lookup table 48 is a list of file names 52, 54 and their corresponding (or correlated with) cryptographically secure checksums 50, 52 arranged in the table 48 such that a particular file 48 (in the data lookup table 46) for which a checksum 50 has been calculated might have two or more file names 52 and 54 in the filename lookup table 48 both of which are different names of the same file but which point to the same cryptographic checksum.

From an inspection of the file lookup table 48 and the data lookup table 46, it can be seen that file name identified by reference numeral 52 and a different file name identified by reference numeral 54 both correspond to the same checksum values 50. The checksum identified by reference numeral 50 in the data lookup table 46 is an index or pointer to a particular file 48 stored in memory.

If it is desired to retrieve a particular file by file name, and if that file name is resident in lookup table 48, the corresponding cryptographically secure checksum 50 uniquely identifies and locates the data 48 within the memory 40 of the server 34 as listed in the data lookup table 40. By way of example, if a client computer, 14-A for instance, requests a copy of the file named "ONE," the file caching server 34 can identify whether the file named "ONE" is available by examination of the file name lookup table 48. If a client computer requests a file named "FIVE," an inspection of the filename lookup table 48 reveals that no such file name exists in the table, suggesting that the file caching server 34 needs to request the file from its central file server 36—a process that takes time and data network resources.

Instead of the file caching server 34 immediately requesting a download of the file "FIVE," the central file server 36 can first determine if the file named "FIVE" is resident on the central file server 36 by searching a list of stored file names and, if resident, determining that "FIVE" has a cryptographically secure checksum equal to "123456." By returning the cryptographically secure checksum for the file named "FIVE" to the file caching server 34, the file caching server 34 can then determine if it has already stored a file with the cryptographically secure checksum of "123456" and if so, return that file to the requesting client.

Upon the file caching server's 34 receipt of the cryptographically secure checksum of "123456" from the central file server 36, the file caching server 34 can search the list of cryptographically secure checksums 52 and determine if an identical cryptographically secure checksum exists. If another file is stored with the same cryptographically secure checksum, albeit under a different name, the file caching server 34 can assume with a very high degree of certainty that the file with the cryptographically secure checksum of "123456" is identical to the FIVE file and that it corresponds to data 48 already stored in memory. Because a cryptographically secure checksum uniquely identifies a file by its contents, the presence of a cryptographically secure checksum in a list of stored files unambiguously confirms that a requested file with a particular cryptographically secure checksum and a stored file having the same cryptographically secure check sum, are in fact, the same, even though they are of different names. The file caching server 34 can thereafter return to the requesting client computer 14-A, the data 48 identified by the cryptographically secure checksum "123456." A duplicative file transfer of the file named "FIVE" from the server 36 can be avoided.

In addition to detecting when a file caching server should request a copy from, or store a file to a main file server, the methodology disclosed above has other applications. Using cryptographically secure checksums to identify files and to determine whether a file is resident on a computer can yield practical benefits in reducing unnecessary file transfers in many file transfer applications, such as on-line printing, which is a web-based service in which on-line print service providers (i.e., on-line print shops) accept print jobs from a customer and render printed output to the customer. The print job is sent from a customer to a print services provider via file transfers that occur via the Internet. In an application like on-line printing, the print service provider computer is analogous to the aforementioned main file server and the customer's client computer is analogous to the file caching server.

With respect to the computers depicted in FIG. 2, a print job for an on-line print service provider can consist of several different files that a customer using a computer identified by reference numeral 14-A for example, needs to send to a print service provider's computer embodied as the server identified by reference numeral 34. A Quark document is an example of a document that can have multiple associated files such as font files, text files and graphics files. (The term "associated files" should be construed to mean files that are separate but related to each other in that all of the files are related to a particular print job.) All of the associated files are needed by the print service provider 34 to generate a printed document. If the customer of an on-line print service provider, (i.e., computer 14-A for example) sends several different files of a Quark print job to the on-line print services provider 34, but subsequently changes one or more of the files using either the client computer 14-A or some other computer, which then transfers the file to computer 14-A, the number of files that need to be resent to the server 34 can be quickly identified and only the modified files re-sent to the server 34.

In the foregoing example, before sending the Quark print job files to the on-line print service provider 34, the customer's client computer 14-A can compute a checksum for each file to be sent. After the checksums are calculated, the Quark print job files can be transmitted to the print service provider 34 for processing the print job. (The printer that would generate any printed output is not shown but those of skill in the art will recognize that the printer would be electrically coupled to the server 34 so as to be able to generate output.) The Quark print job files can include font files, graphic or image files and text files. If after transmitting the print job files to the server 34, the customer 14-A changes a text file for instance, unnecessary file transfers of the font files and graphics files can be avoided by using the cryptographically secure checksums to identify the particular files that need to be resent to the print service provider 34.

When one or more files of a multi-file print job is changed, the customer's client computer 14-A (i.e., a "client" 14-A to the print service providers "sever" computer 34) can recalculate checksums for the files of the print job. After doing so, the client computer 14-A can ask the server 34 for the checksums of the print job files that the server 34 already has from any previous file transmissions. By the client's 14-A comparison of the cryptographically secure checksums (i.e., "checksums") of print job files that are returned by the server, to the most-recently calculated checksums of print job files on the client 14-A, the client 14-A can identify the print job files on the server 34 that do not match the print job files on the server 34 and then send to the server 34 only the print job files on the client 14-A, the checksums of which do not match the checksums of files stored on the server.

Print job files for customers can be stored on the print services provider server for future use. If a customer returns to an on-line print service provider for more print services at a later date, or if a new customer submits a print job, the files from a previous print job might be re-useable in a new print job. Before a client sends files of a print job to the print services provider's server computer, the customer's client computer can calculate the cryptographically secure checksums of the print job and send those checksums to the server to allow the server to determine if it already has any of the checksums stored. Alternatively, the client can interrogate the server for the presence of files having particular checksums. Files on the server that have cryptographically secure checksums matching the checksums of a print job to be sent to the server can be determined to exist on the server and do not need to be re-transmitted to the server by the client.

While the foregoing example is with regard to on-line printing, those of ordinary skill in the art will recognize the method can be applied to any other technology or service requiring file transfers.

Figure 3:
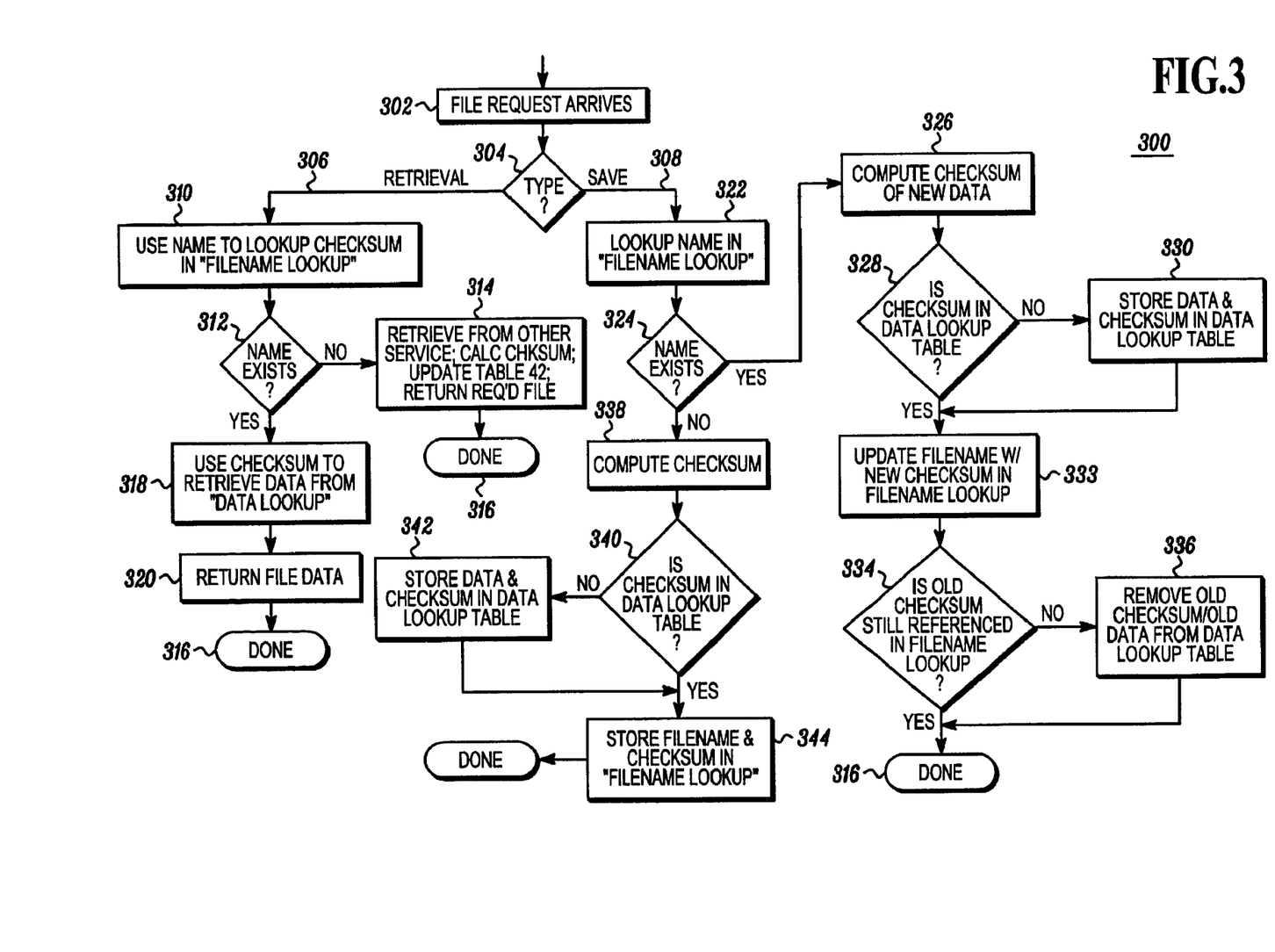
FIG. 3 is a flow chart of a method for retrieving and saving files to and from a file caching server using cryptographically secure file identifiers according to an embodiment of the present invention.

FIG. 3 depicts the steps of a method for managing the retrieval and storage of data files on a file caching server 34 depicted in FIG. 2. At step 302, a file request message to the file caching server (34 in FIG. 2) is received from a client computer (e.g., 14 in FIG. 2) via a network, such as the Internet. In the context of the method 300 shown in FIG. 3, the file-request step 302 is directed to a file caching server (i.e. a computer) whereat files are stored and from which files can be retrieved. Such a computer or network of computers where files are stored and from which they can be retrieved is also considered to be a "data resource" in that data can be obtained from and sent to such a device as needed.

In the most general application of the method depicted in FIG. 3, the file request step 302 could be either a request to store a file or retrieve a file. In step 304 a determination is made of the file request message from the client computer 14 to determine whether or not it is a retrieval request 306 or a file save instruction 308.

In the case where a file request is a retrieval request 306, (i.e. a request to the data resource to send a particular file or files) step 310 is executed whereat the data resource uses the name or names of the file(s) requested as an index into a file name lookup table, such as the file name lookup table 48 depicted in FIG. 2.

Using any appropriate sorting algorithm, at step 312, the data resource (a file caching server) determines whether the named, requested file or files exist in the file name lookup table 48. If the requested-file name does not exist in the filename lookup table, at step 314 an appropriate response is returned to the client computer indicating that: no file exists with the requested-file name. The file is retrieved from another server, the checksum is calculated and added it to the table before returning the requested file to the client.

If the requested-file name is determined to exist in the file name lookup table 48, and for which a cryptographically-secure checksum will therefore exist, at step 318 the cryptographically secure checksum 52 which corresponds to the file name located in the file name lookup table 48 is used in the data lookup table 46 to locate the data to be retrieved 46. In step 320, the file is retrieved from memory 40 and transmitted as part of step 320 to the requestor (e.g. a client 14) of the particular file. Program execution stops at step 316.

Returning to step 304, if the file request was a request to save (a "save file" request) or to store a file 308 at the file server 34, the name of the file to be saved or stored is tested against existing file names in the file name lookup table 48 as part of step 322. Using any appropriate sorting algorithm, the name of the file to be stored is searched for in the file lookup table 48. If in step 324 it is determined that the name already exists, in step 326 the data resource (i.e. the computer) computes the cryptographically secure checksum of the data file received at step 302 and determines if that same cryptographically secure checksum is already stored within the file name lookup table 48 in step 328. If it is determined that the cryptographically secure checksum does not already exist in memory, the recently-calculated cryptographically secure checksum is stored at step 330 in the data lookup table 48 along with the file name.

If the cryptographically secure checksum already exists in the file name lookup table, program control proceeds to step 333 where the file name received at step 302 is stored in the file name lookup table 48 along with the previously-calculated checksum. At step 333 the contents of the file name lookup table 48 are tested to determine if a different file name exists in the file name lookup table 48 with outdated cryptographically secure checksum 52. At step 324, if no file name exists with a different cryptographically secure checksum, that checksum and the associated file data is removed from the data lookup table 48 in step 324. At the conclusion of either step 322 or the completion of step 324 program control is discontinued at step 316 as shown.

Returning to step 324, if it is determined that the file named to be stored in memory does not exist at step 324, the checksum of the data or file to be stored is calculated at step 338 using the file contents that were received at the data resource for storage. Once that checksum is computed at step 338, a determination is made at step 340 whether or not the checksum exists in the data lookup table. If the computed cryptographically secure checksum does not exist, i.e. in the file name lookup table 48, at step 342 the recently-calculated cryptographically secure checksum is stored with the data file that was used to calculate the cryptographically secure checksum in the lookup table 46. The file name and the cryptographically secure checksum are stored in the file name lookup table 48 at step 344. At step 340, if the calculated checksum is determined to be within the data lookup table 46, program control proceeds to step 344.

Figure 4:
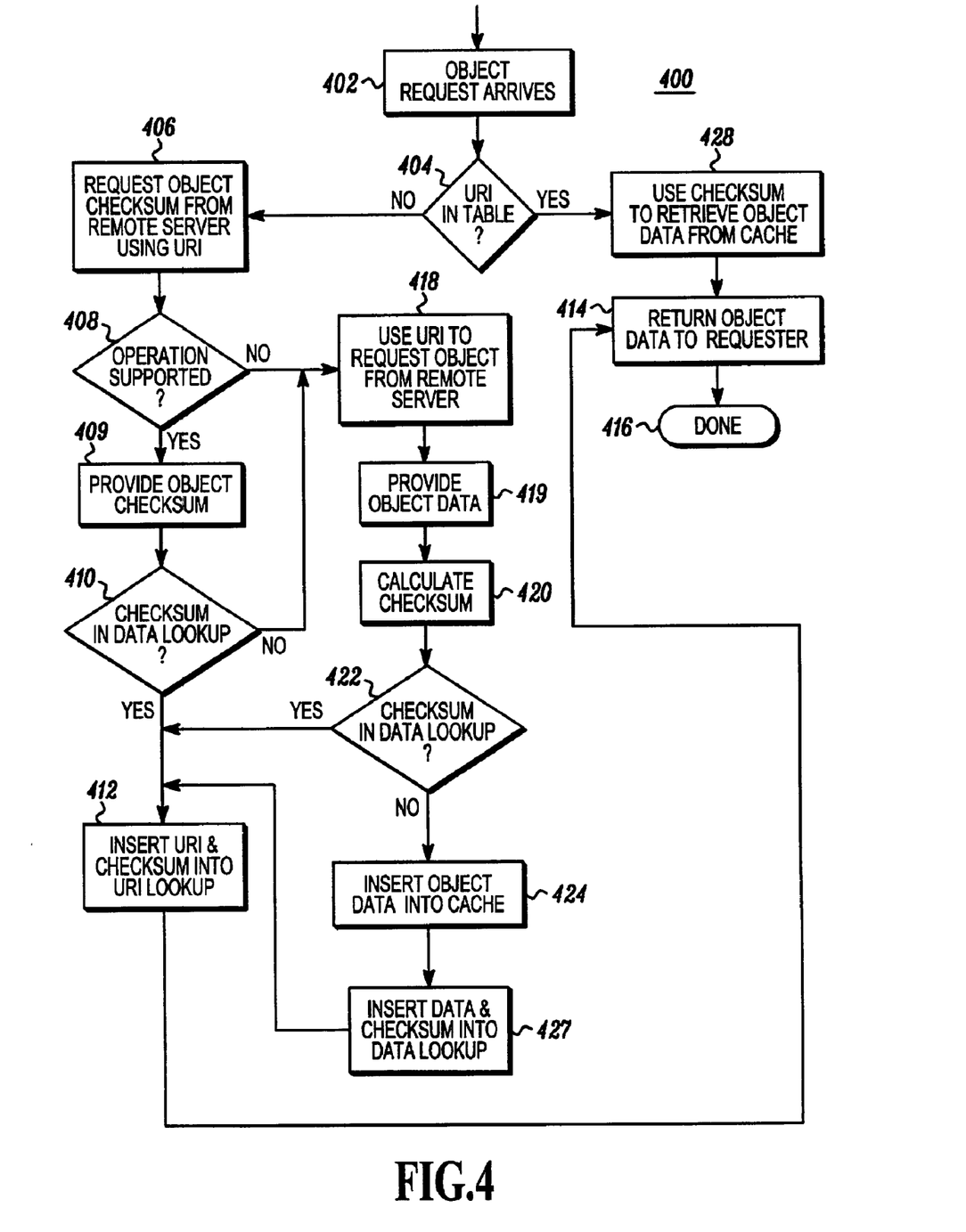
FIG. 4 is a flow chart of a method for caching files utilizing a cryptographically secure file identifier according to an embodiment of the present invention.

FIG. 4 depicts the steps of a method 400 for retrieving a cached data object from a data resource, such as the file caching server 34 depicted in FIG. 2. In FIG. 4, the method 400 begins with receipt of a request for an object, such as a data file in step 402. When a data resource such as the file caching server 34 receives a request for a file or object in step 402, in step 404, the method first performs a test for the presence of a (uniform resource identifier or "URI" at least part of which will be stored in the file caching server 34 filename lookup table 48. The URI can be considered to be a combination of a file name and a server 36 (in FIG. 2) where the file name is expected to reside. The URI therefore approximates the file name being requested by a client computer for example.

At step 404, the data resource determines whether or not the requested URI is in the file name lookup table. If it is determined that the URI is not resident in the file name lookup table, in step 406 the data resource requests from its remote server 36 a cryptographically secure checksum corresponding to the URI that was requested from the data resource in step 402, and receives the response from the remote server 36.

At step 408, the data resource that was requested in step 402 for a particular object determines whether or not the remote server from which the object was requested supports file retrieval and storage using cryptographically secure checksum identifiers of objects. If the remote server supports cryptographic file storage and retrieval, at step 409 the object checksum is provided, and in step 410 the file caching server or other data resource determines whether the cryptographically secure checksum received as a response from the remote server in step is within the data lookup table 46 of the local server 34. If it is determined that the cryptographically secure checksum is already in the data lookup table 46, the data resource inserts that URI and checksum into its URI lookup table 48 at step 412. The requested object or file is returned to the data requestor at step 414 with program execution ending at step 416. Returning to step 408, if it is determined that the remote server 36 does not support object requests using cryptographically secure checksums, the data resource or file caching server 34 uses the URI of the object requested in step 402 to request from the remote server a copy of the requested object in step 418. At step 419, the object data is provided. At step 420, the requested object, which for purposes of step 420 was delivered to the data resource by the remote server, has its cryptographically secure checksum calculated in step 420. At step 422 the data resource determines whether or not the calculated checksum is in the data resource data lookup table 46. If it is determined that that checksum is in the data lookup table 46 program control transfer to step 412 after which the calculated checksum and the URI are used to return the requested object to the requestor in step 414.

At step 422, if the calculated checksum is in the data lookup table 46, step 412 is executed where the file name lookup table is updated. If the calculated checksum is not in the data lookup table 46, the decision of step 422 is to "cache it" in memory in step 424. The calculated checksum and data, already retrieved from the remote server is used to update the data lookup table 46 in step 427. Program control then progresses from step 427 to step 412 where, as set forth above, the file name lookup table is updated with the calculated checksum and the URI as set forth above.

Returning to step 404, if the URI is determined to be within the file name lookup table 48, the URI or file name in the file name lookup table 48 is used at step 428 to retrieve an object from the data resource or file caching server 34.

From the foregoing, it should be apparent that a method for managing data file storage in a data network comprises using cryptographically secure checksums as file identifiers. The presence or absence of a cryptographically secure checksum as a file identifier in a data resource, such as a file caching server, operates as a shorthand method for determining the presence or absence of a requested file. If such a file identifier is present in a list or table against which one or more file names may be indexed, it is possible to search for either the cryptographically secure checksum or a file name. If correspondence between a file name and a cryptographically secure checksum exists, that cryptographically secure checksum operates as an index or identifier for the data from which the cryptographically secure checksum was calculated. Stated alternatively, two separate lists can be maintained. One list or table of file names and corresponding checksums can be used to quickly identify the presence or absence of files by their file names. A second table or list of just the cryptographically secure checksums as an index to the files from which those checksums were calculated can be used to quickly determine whether or not the file that yielded such a checksum is present. By quickly searching a list of such checksums, a request for a file by checksum can quickly yield a determination of whether or not the file is resident in the data resource.

If a client computer requests one or more files by name, the request directed to a file caching server can avoid unnecessary file transfers from a remote server if the requested file is already resident on the caching server as evidenced by a cryptographically secure checksum that uniquely identifies the requested file as being resident in that server. In instances where there may be ambiguity of the requested file name, the caching server can request from the remote server the checksum of the requested files and thereby determine if those checksums are the same as those in its already-stored tables.

This method for managing data storage in a data network may be extended to more sophisticated cache management and data storage through techniques well known by those skilled in the art, such as write-aware data caching, and the storage and transmission of differences between versions of files as well as differences between two files having difference names. Those of ordinary skill in the computer science and data network arts will recognize that these and other variations can be implemented with appropriately programmed computers using stored program instructions kept within memory 40 or other accessible storage media, and that the foregoing embodiments are within the scope of the appended claims.

What is claimed is:

1. A method of managing data files in a file caching server that provides access to a plurality of stored data files, said method comprising:

receiving a request for a file identified by a cryptographically secure checksum;

determining if said file resides on said file caching server using said cryptographically secure checksum and, if said file resides on said file caching server, retrieving said file from said file caching server;

if said file does not reside on said file caching server, then requesting from another file server, a remote file identified by said cryptographically secure checksum.

2. The method of claim 1, comprising:
   providing the file in response to the request.

3. The method of claim 1, comprising:
   receiving the remote file from the other file server.

4. The method of claim 3, comprising:
   providing the remote file in response to the request.

5. The method of claim 1, wherein the request includes a first file name, further comprising: a string of characters.

6. A method of managing flies on a file caching server, comprising:

receiving, at said file caching server, a file save request including a file to be saved on said file caching server and a file name associated with said file under which said file is to be saved;

determining a cryptographically secure checksum from contents of said file;

prior to saving said file, determining if said file is stored on said file caching server by the presence of the cryptographically secure checksum in said file caching server;

if the cryptographically secure checksum is not present in said file caching server, then storing the file, the file name, and the cryptographically secure checksum within the file caching server.

7. The method of claim 6, further comprising:
   determining if the cryptographically secure checksum is present on a file server to which said file caching server is operatively coupled
   if the cryptographically secure checksum is not present in said file server, then storing the file, the file name, and the cryptographically secure checksum within the file server.

8. A data network comprised of:
   a file caching server capable of receiving requests for files from client computers operatively coupled to said file caching server, the file caching server identifying requested files by a cryptographically secure checksum, said file caching server delivering to a client a locally stored copy of the requested file if said requested file is identified by said cryptographically secure checksum as being stored on said file caching server, and said file caching server delivering to the client a remotely stored copy of the requested file obtained from a file server if said requested file is not identified by said cryptographically secure checksum.

9. A data network comprised of:
   a file server capable of storing files from a file caching server operatively coupled to said file server, the file server identifying a file to be stored by a cryptographically secure checksum, said file server storing said file from said file caching server if said file is not identified as being stored on said file server by the presence in said file server of said cryptographically secure checksum.

10. Data storage media configured to store executable computer program instructions to cause a computer to:

receive a request for a file which is identified by a cryptographically secure checksum;

determining if said file resides on said computer using said cryptographically secure checksum and, if said file resides on said computer, retrieving said file from said computer;

if said file does not reside on said computer, then requesting from a second computer a remote file identified by said cryptographically secure checksum.

11. A method of managing the transfer of a plurality of associated data files between a server and a client having a plurality of files to send to said server, said method comprising:

said client calculating a cryptographically secure checksum for at least a first file of said plurality of files;

said client determining if said server has a file with an identical cryptographically secure checksum;

if said server has a file with an identical cryptographically secure checksum, determining that said server has a copy of said first file;

if said server does not have a file with an identical cryptographically secure checksum, sending said first file to said server by said client.

12. The method of claim 11 wherein said plurality of files are print job files.

13. The method of claim 11 wherein said server is an on-line print service provider computer.

14. The method of claim 11 wherein said client is a computer of a customer to an on-line print service provider.

15. The method of claim 11 wherein the step of said client determining if said server has a file with an identical cryptographically secure checksum comprises: said client transmitting said checksums to said server and receiving from said server an identification of the checksums on the server that do not match checksums received from said client.

16. The method of claim 11 wherein the step of said client determining if said server has a file with an identical cryptographically secure checksum comprises: said client transmitting said checksums to said server and receiving from said server an identification of the checksums on the server that do match checksums received from said client.

17. A method of managing the transfer of a plurality of associated data files between a server and a client having a plurality of files to send to a server, said method comprising:

said client calculating a checksum for each file of said plurality of files;

said client sending each of said plurality of files to said server;

modifying at least one of said plurality of files;

said client recalculating the checksum for each of said plurality of files:

said client determining which of the files stored on said server have checksums that do not match the recalculated checksums;

said client re-sending to said server, only the files stored on the server whose checksums do not match the recalculated checksums on the client.

18. The method of claim 17 wherein said step of modifying at least one of said plurality of files comprises: said client modifying said at least one of said files.

19. The method of claim 17 wherein said step of modifying at least one of said plurality of files comprises: modifying said at least one of said files by a computer other than said client and said server.

20. The method of claim 17 wherein said plurality of files are print job files.

21. The method of claim 17 wherein said server is an on-line print service provider computer.

22. The method of claim 17 wherein said client is a computer of a customer to an on-line print service provider.

23. A method of managing the transfer of a plurality of associated data files between a server and a client having a plurality of files to send to said server, said method comprising:

said server receiving said plurality of files;

said server calculating a checksum for each file and storing the server-calculated checksums in a first list;

said server receiving a second list of client-calculated checksums from said client;

said server identifying to said client, checksums in the second list that are not in the first list;

said server receiving from said client, files whose checksums were not in the second list.

24. The method of claim 23 wherein said files are print job files.

25. The method of claim 23 wherein said step of identifying to said client, checksum in the second list that are not in the first list is comprised of the steps of: comparing the contents of said first list to the contents of said second list and identifying elements of the second list that are not in the first list.

* * * * *

UNITED STATES PATENT AND TRADEMARK OFFICE
CERTIFICATE OF CORRECTION

PATENT NO. : 6,944,634 B2
APPLICATION NO. : 10/128916
DATED : September 13, 2005
INVENTOR(S) : William Edward Hertling et al.

It is certified that error appears in the above-identified patent and that said Letters Patent is hereby corrected as shown below:

Column 9, Claim 6, line 33, delete "flies" and insert therefor --files--

Column 11, Claim 17, line 1, delete "flies" and insert therefor --files--

Signed and Sealed this

Fifth Day of December, 2006

JON W. DUDAS
*Director of the United States Patent and Trademark Office*